(12) United States Patent
Paulus et al.

(10) Patent No.: US 12,493,947 B2
(45) Date of Patent: Dec. 9, 2025

(54) METHOD AND SYSTEM FOR INSPECTING AN OPHTHALMIC LENS IN AN AUTOMATED LENS MANUFACTURING PROCESS

(71) Applicant: Alcon Inc., Fribourg (CH)

(72) Inventors: Daniel Paulus, Miltenberg (DE); Jens Hof, Grosswallstadt (DE); Susanne Fechner, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 462 days.

(21) Appl. No.: 18/065,675

(22) Filed: Dec. 14, 2022

(65) Prior Publication Data

US 2023/0196547 A1    Jun. 22, 2023

Related U.S. Application Data

(60) Provisional application No. 63/265,553, filed on Dec. 16, 2021.

(51) Int. Cl.
*G06T 7/00* (2017.01)
*G02C 7/04* (2006.01)
(Continued)

(52) U.S. Cl.
CPC .............. *G06T 7/0008* (2013.01); *G02C 7/04* (2013.01); *G06T 3/147* (2024.01); *G06T 7/33* (2017.01); *G06T 7/62* (2017.01)

(58) Field of Classification Search
CPC ......... G06T 7/0008; G06T 3/147; G06T 7/33; G06T 7/62; G02C 7/04; G01M 11/0214; G01M 11/0278; G01M 11/0264
See application file for complete search history.

(56) References Cited

U.S. PATENT DOCUMENTS 11,617,509 B2 *  4/2023  Anderson ............ A61B 3/0025
                                                      351/221
11,669,968 B2 *  6/2023  Ashok ....................... A61B 3/12
                                                      382/128
(Continued)

FOREIGN PATENT DOCUMENTS

AU        5241593 A  *  6/1994  ........ G01M 11/0214
CA      2309922 A1 *  5/1999  ........ G01M 11/0214
(Continued)

*Primary Examiner* — Charles T Shedrick
(74) *Attorney, Agent, or Firm* — Sheng-Hsin Hu (57) ABSTRACT

A method (6) for inspecting an ophthalmic lens (2), in particular a contact lens such as a soft contact lens (2), in an automated lens manufacturing process is disclosed. The method comprises the steps of acquiring (60) a plurality of images containing the ophthalmic lens (2) to be inspected as an imaged ophthalmic lens (2), wherein each image (4) of the plurality of images is of a different image type, registering (63) the plurality of images by applying a registration function to each image (4) of the plurality of images to obtain registered images, determining (64), based on the registered images, whether the ophthalmic lens (2) complies with predetermined specifications, and updating (62) the registration function to compensate for possible changes in the acquisition of the plurality of images. Updating (62) the registration function is performed during the automated lens manufacturing process.

17 Claims, 5 Drawing Sheets

(51) Int. Cl.
    *G06T 3/147*    (2024.01)
    *G06T 7/33*    (2017.01)
    *G06T 7/62*    (2017.01)

(56) References Cited

U.S. PATENT DOCUMENTS

| | | | | |
|---|---|---|---|---|
| 2008/0273073 A1* | 11/2008 | Oakley | | B29D 11/00019 |
| | | | | 347/103 |
| 2011/0102775 A1* | 5/2011 | Palmer | | G01M 11/0257 |
| | | | | 356/124 |
| 2012/0050488 A1* | 3/2012 | Cohen | | H04N 17/002 |
| | | | | 348/46 |
| 2021/0279858 A1* | 9/2021 | Stoppe | | G06T 5/90 |

FOREIGN PATENT DOCUMENTS

| | | | | |
|---|---|---|---|---|
| CN | 119700007 A | * | 3/2025 | |
| DE | 102018114005 A1 | * | 12/2019 | ............... G06T 5/50 |
| EP | 2131174 A2 | | 12/2009 | |
| WO | 2007060173 A1 | | 5/2007 | |
| WO | 2015053712 A1 | | 4/2015 | |

* cited by examiner

METHOD AND SYSTEM FOR INSPECTING AN OPHTHALMIC LENS IN AN AUTOMATED LENS MANUFACTURING PROCESS

FIELD OF THE INVENTION

The present invention generally relates to the field of manufacturing ophthalmic lenses, in particular contact lenses such as soft contact lenses. More specifically, it is related to a method and a system for inspecting an ophthalmic lens in an automated lens manufacturing process.

BACKGROUND OF THE INVENTION

In the automated manufacture of ophthalmic lenses, in particular contact lenses such as soft contact lenses, the contact lenses are typically optically inspected for the presence of defects such as inclusions, bubbles, scratches, tears, edge defects, or the like. To perform the inspection, a contact lens to be inspected may be contained in an inspection cuvette which is transported through various inspection stations, and different types of images containing the contact lens are acquired.

For instance, four different images are acquired with the aid of four optical imaging devices each containing a camera (the four optical imaging devices may form an integral part of a single inspection system). The four different images may be a telecentric bright-field image, a diffuse bright-field image, a dark-field image and a phase-contrast image. Acquisition of the four different images is helpful in identifying certain types of defects which are well visible in specific types of images only. Vice versa, structures or components that may appear as a possible defect of the contact lens in one type of image may be identified as not being a defect of the contact lens with the aid of images of another type.

In order to be able to use the information contained in all images of the different types, it is necessary to transform each of the images to one common frame, thus 'registering' the plurality of images to compensate for differences in resolution, distortion, orientation and alignment of the different images relative to one another. Such differences may be caused by the different optical imaging devices. With the aid of the information contained in the registered images it is possible to determine whether the contact lens under inspection may be accepted or must be rejected.

Registration of the images of the different types may be performed by applying a registration function to each of the images. The registration function may be determined by acquiring an image of an object having properties which are exactly known (a 'registration object') with each of the optical imaging devices. The images obtained with the optical imaging devices are then mapped with the known properties of the registration object to determine the registration function. The registration function is determined prior to starting the lens manufacturing process, and is subsequently applied during the lens manufacturing process to the images of the contact lenses during their inspection, in order to determine whether a contact lens is acceptable or must be rejected. When the lens manufacturing process is interrupted for whatever reason, the registration function may be determined again (updated) in the manner described above, since changes may have occurred in the optical imaging devices during the lens manufacturing process. In particular, the registration function is updated in case any mechanical changes in the optical imaging devices or any disruption in their operation have been observed. After completion of the update of the registration function, production of contact lenses is resumed using the updated registration function.

Obviously, there is room for improvement as the determination of the registration function requires that the lens manufacturing process (and in particular the lens inspection process) is interrupted, since images of the registration object are required for the determination of the registration function. Also, in the course of updating the registration function it may turn out that no changes have occurred in the imaging devices during the lens manufacturing process, so that the update of the registration function has been made in vain and has thus caused unnecessary expense. In case updating the registration function requires an extra downtime of the production line, this may reduce the efficiency of the lens manufacturing process.

It is therefore an object of the invention to suggest a method and an inspection system overcoming the aforementioned disadvantages.

SUMMARY OF THE INVENTION

In accordance with the present invention, these and other objects are met by a method and an inspection system for inspecting an ophthalmic lens, in particular a contact lens such as a soft contact lens, as they are specified by the features of the independent claims.

Advantageous aspects of the method and the inspection system according to the invention are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value A to "about" numerical value B is disclosed, this is to be understood to include and explicitly disclose a range of numerical value A to numerical value B. Also, whenever features are combined with the term "or", the term "or" is to be understood to also include "and" unless it is evident from the specification that the term "or" must be understood as being exclusive.

According to the invention, a method for inspecting an ophthalmic lens, in particular a contact lens such as a soft contact lens, in an automated lens manufacturing process is suggested. The method comprises the steps of
acquiring a plurality of images containing the ophthalmic lens to be inspected as an imaged ophthalmic lens, wherein each image of the plurality of images is of a different image type,
registering the images of the plurality of images by applying a registration function to each image of the plurality of images to obtain registered images,
determining, based on the registered images, whether the ophthalmic lens is acceptable, and
updating the registration function to compensate for possible changes in the acquisition of the plurality of images.

Updating the registration function is performed during the automated lens manufacturing process.

According to one aspect of the method according to the invention, each image of the acquired plurality of images contains a plurality of imaged reference marks. Registering the images of the acquired plurality of images and updating the registration function is performed based on the positions of the imaged reference marks contained in the images. In addition, registering the images of the acquired plurality of images and updating the registration function may be performed based on the distances of the positions of the imaged reference marks from a reference point in each image of the acquired plurality of images.

According to another aspect of the method according to the invention, the ophthalmic lens is carried by a lens carrier, with the lens carrier having reference marks arranged thereon which are contained in the images as the imaged reference marks.

According to still another aspect of the method according to the invention, the method further comprises the step of identifying those imaged reference marks which are located outside of the imaged ophthalmic lens. Only those imaged reference marks located outside of the imaged ophthalmic lens are used for registering the images of the plurality of images and updating the registration function.

According to a further aspect of the method according to the invention, each image of the acquired plurality of images comprises five imaged reference marks, with at least four of the five imaged reference marks being located outside of the imaged ophthalmic lens.

According to another aspect of the method according to the invention, the acquired plurality of images comprises four images. The different image types of the four images are a telecentric bright-field image, a diffuse bright-field image, a dark-field image and a phase-contrast image.

According to still another aspect of the method according to the invention, each image of the plurality of images is acquired by a separate optical imaging device, each separate optical imaging device comprising a camera.

According to yet another aspect of the method according to the invention, the registration function is an affine transformation.

According to the invention, an inspection system for inspecting an ophthalmic lens, in particular a contact lens such as a soft contact lens, in an automated lens manufacturing process is also suggested. The inspection system comprises a plurality of optical imaging devices, each optical imaging device of the plurality of optical imaging devices being arranged and configured to acquire an image containing the ophthalmic lens to be inspected as an imaged ophthalmic lens thus obtaining a plurality of images, wherein each image of the plurality of images is of a different image type.

The inspection system further comprises a processor configured to register the images of the plurality of images by applying a registration function to each image of the plurality of images to obtain registered images to determine, based on the registered images, whether the ophthalmic lens is acceptable, and to update the registration function to compensate for possible changes in one or more of the optical imaging devices of the plurality of optical imaging devices.

The processor is further configured to update the registration function during the automated lens manufacturing process.

According to one aspect of the inspection system according to the invention, each image of the acquired plurality of images contains a plurality of imaged reference marks. The processor is further configured to register the images and to update the registration function based on the positions of the imaged reference marks contained in the images. In addition, the processor may be further configured to register the images of the acquired plurality of images and to update the registration function based on the distances of the positions of the imaged reference marks from a reference point in each image of the acquired plurality of images.

According to another aspect of the inspection system according to the invention, the inspection system further comprises a lens carrier configured to carry the ophthalmic lens, with the lens carrier having reference marks arranged thereon which are contained in the images as the imaged reference marks.

According to still another aspect of the inspection system according to the invention, the lens carrier is an inspection cuvette having a bottom glass with a concave bottom glass top surface for the ophthalmic lens to rest on.

According to a further aspect of the inspection system according to the invention, the processor is further configured to identify those imaged reference marks which are located outside of the imaged ophthalmic lens. The processor is further configured to use only those imaged reference marks located outside of the imaged ophthalmic lens to register the images and to update the registration function.

According to still a further aspect of the inspection system according to the invention, the plurality of imaged reference marks comprises five imaged reference marks, with at least four of the five imaged reference marks being located outside of the imaged ophthalmic lens, and the processor is configured to use only the at least four imaged reference marks located outside of the imaged ophthalmic lens to register the images and to update the registration function.

According to a further aspect of the inspection system according to the invention, the reference marks arranged on the lens carrier are cylindrically shaped recesses having a diameter in the range of 250 micrometers to 350 micrometers, especially about 300 micrometers. The recesses further have a depth in the range of 3 micrometers to 6 micrometers, in particular about 6 micrometers, and a bottom surface of the recesses has a surface roughness $S_a$ in the range of 0.8 micrometers to 2 micrometers, in particular about 1.3 micrometers.

According to another aspect of the inspection system according to the invention, the recesses are generated by laser-machining.

According to still another aspect of the inspection system according to the invention, the plurality of optical imaging devices comprises four optical imaging devices, including a first optical imaging device configured to acquire a telecentric bright-field image, a second imaging device configured to acquire a diffuse bright-field image, a third imaging device configured to acquire a dark-field image, and a fourth imaging device configured to acquire a phase-contrast image.

According to still another aspect of the inspection system according to the invention, each optical imaging device of the plurality of optical imaging devices is a separate optical imaging device comprising a camera.

In the following, advantages of the invention will be discussed for the inspection of contact lenses, in particular soft contact lenses, representing the ophthalmic lenses. Updating the registration function during the automated lens manufacture process means that the lens manufacturing process does not need to be interrupted anymore to be able to perform the update. Thus, a downtime of the production line or an interruption the lens manufacturing process is no longer required in order to be able to perform an update of the registration function. Also, as the registration function is updated during the automated lens manufacturing process, the update may generally be performed at any time during the automated lens manufacturing process, with even very short time intervals between the updates of the registration function being possible. These time intervals may be as short as the time needed to inspect an arbitrary small number of contact lenses. By way of example, this small number may correspond to the number of contact lenses contained in inspection cuvettes which are commonly arranged on a same cuvette shuttle transporting the inspection cuvettes arranged thereon through the inspection stations. In such instance, the registration function is updated for each individual cuvette shuttle. Thus, any possible changes that may have occurred in the optical imaging devices can be compensated for immediately after inspection of the contact lenses which are contained in the cuvettes commonly arranged on the same cuvette shuttle. However, updating the registration function for each of the cuvette shuttles involves considerable computational expense. Therefore, it is also possible to perform an update of the registration function once all cuvette shuttles present in a production line have passed through the inspection station at least once. As a further alternative, after a predetermined time has elapsed or after a predetermined number of contact lenses have been manufactured an update of the registration function may be performed. In any event, updating the registration function is to be understood to include cases in which it is determined that no changes to the registration function are necessary. Alternatively, it may be determined that changes to the registration function are actually required, and updating the registration function is to be understood to include such cases as well.

As a consequence of performing the update of the registration function during the lens manufacturing process, in addition to avoiding downtime of the production line or an interruption of the lens manufacturing process to perform an update of the registration function during which changes to the registration function are necessary, any unnecessary downtimes for updating the registration function although no changes to the registration function are necessary are avoided as well. In particular, it is also avoided that the lens manufacturing process is interrupted for the only reason to perform an update of the registration function.

In case imaged reference marks are contained in each image of the plurality of images acquired, this simplifies registration of the acquired images, as the imaged reference marks provide a reference which is the same for all images of the plurality of images and for all optical imaging devices of the plurality of optical imaging devices. It is vital, therefore, that the imaged reference marks are visible in each image of the plurality of images (i.e. in all acquired images of the different types). Since the imaged reference marks are contained in each image, and since the images need to be acquired in any event for the inspection of the ophthalmic lens, no additional images are necessary to update the registration function. By using the positions of the imaged reference marks for the update of the registration function, it can be ensured that differences between the images due to positioning, alignment and orientation of the optical imaging devices relative to each other are compensated for, because such changes are detected as changes of the positions of the imaged reference marks. By additionally using the distances of the positions of the imaged reference marks from a reference point in each image of the acquired plurality of images to register the images and to update the registration function, differences in the resolution and magnification of the optical imaging devices relative to each other can be detected and compensated for. The reference point may, for example, be the center of an image of the bottom glass of a lens carrier (e.g. a cuvette) on which the imaged reference marks are arranged. Alternatively, the reference point may be the center of a circle along which the imaged reference marks are arranged in the image. As a further alternative, the reference point may be a point of symmetry of the arrangement of the imaged reference marks in the image.

In case the reference marks that appear as imaged reference marks in the acquired images are (fixedly) arranged on a lens carrier, this makes sure the reference marks are always arranged in the same positions on the lens carrier. This position does not change or vary. The reference marks are advantageously arranged in a portion of the lens carrier which is located at a predetermined distance from the default position of the contact lens on the lens carrier, this predetermined distance being chosen such that the imaged reference marks are always contained in the acquired images without any adjustments to the field of view of the optical imaging devices being necessary. In addition, through the presence of the reference marks on the lens carrier there is no need to provide a registration object or other registration tool to perform the update of the registration function.

Preferably, all imaged reference marks are located outside of the image of the contact lens under inspection. However, in some instances it may occur that not all of the imaged reference marks are actually located outside of the image of the contact lens. For example, in case the contact lens is arranged on the lens carrier such that one or more of the reference marks on the lens carrier are covered by the contact lens, only those imaged reference marks located outside of the imaged contact lens are used for registering the images and for updating the registration function. Thus, identifying those imaged reference marks located outside the imaged contact lens and using only these imaged reference marks for registering the acquired images has the advantage that any optical effect on the position (and thus on the distance from the reference point) of the imaged reference mark that may result from the contact lens covering the reference mark on the lens carrier does not play a role in the registration of the images or the update of the registration function. Thus, it is ensured that the imaged reference marks contained in the images reflect the actual position of the corresponding reference marks arranged on the lens carrier without being distorted, magnified or spatially shifted or altered in any other manner by optical effects caused by the contact lens.

For example, five reference marks may be provided on the lens carrier. Having at least four of these five reference marks located outside of the contact lens under inspection allows to reliably register the images and update the registration function. For example, the five reference marks may be arranged on the lens carrier at predetermined locations such that once the contact lens is arranged on the lens carrier at the default position, the reference marks on the lens carrier are arranged along the circumference of the contact lens (e.g. on a circle) but outside of the contact lens. In such instance, all five imaged reference marks contained in the images may be used to register the images and update the registration function. In other instances, however, only four out of these five reference marks are arranged outside of the contact lens under inspection. This may in particular occur when toric contact lenses are inspected, as toric contact lenses may not always be perfectly arranged at the default position on the lens carrier. In such instances, the imaged reference mark that is not located outside of the image of the contact lens is ignored while the other four imaged reference marks located outside of the image of the contact lens are used for the registration of the images and for updating the registration function.

The plurality of images of the different types may in particular comprise four images of a different type. These four images may be a telecentric bright-field image, a diffuse bright-field image, a dark-field image and a phase-contrast image. The telecentric bright-field image makes sure all dimensions of the contact lens are correctly shown in the image, independent of the distance of a respective portion of the contact lens to a focal plane of the camera of the optical imaging device. In addition, the telecentric bright-field image may assist in the determination whether or not the contact lens is inverted in case small pigments are contained in the contact lens (this determination being possible through an analysis of the pigment structure, as is known in the art). The diffuse bright-field image shows the edges and contours of the contact lens and the dark-field image highlights any scattering centers contained in the contact lens. The phase-contrast image indicates differences of the optical power in the zones of a contact lens. Specific types of defects may be identified only in one type of the different image types, and thus it is advantageous to have all four image types available. Also, artifacts contained in one type of image may be identified as artifacts and can be distinguished from actual defects with the aid of one or more of the other types of images.

Acquiring each image of the plurality of images by a separate optical imaging device, each comprising a camera, allows for the simultaneous acquisition of the plurality of images. Moreover, it is avoided that the optical imaging device needs to be reconfigured for each different image type, what may lead to additional obstacles for registering the plurality of images. Thus, the time needed to inspect the ophthalmic lens can be reduced.

Using an affine transformation as the registration function makes sure no undesired distortions are generated in the images during the registration. In addition, an affine transformation can be represented by matrices, thus allowing for comparatively simple computational operations and straightforward methods for updating the registration function.

An inspection cuvette having a bottom glass allows for an illumination of the ophthalmic lens from the bottom. Furthermore, a concave bottom glass top surface ensures that the lens is arranged in a designated portion of the bottom glass by gravity once it is arranged on the bottom glass top surface with the convex anterior surface of the lens resting on the concave bottom glass top surface.

Reference marks having the dimensions and surface properties specified above (diameter, depth, and surface roughness of the recesses) ensure that the imaged reference marks are well visible in all four images of the plurality of images. In this regard, it is to be noted that the diameter of the recesses is measured in the direction of the viewing axis of the imaging device whereas the depth and the surface roughness of the recesses are measured in a direction normal to a tangent to the surface at the location where the recesses are arranged on the lens carrier.

Using laser-machining techniques to generate the recesses having the respective dimensions and surface roughness specified above is advantageous in that the reference marks are generated with a sufficiently high accuracy.

The advantages of the system according to the invention mirror those of the method according to the invention and are not repeated here.

BRIEF DESCRIPTION OF THE DRAWINGS

Further advantageous aspects of the invention become apparent from the following description of embodiments of the invention with the aid of the schematic drawings, in which.

Figure 1:
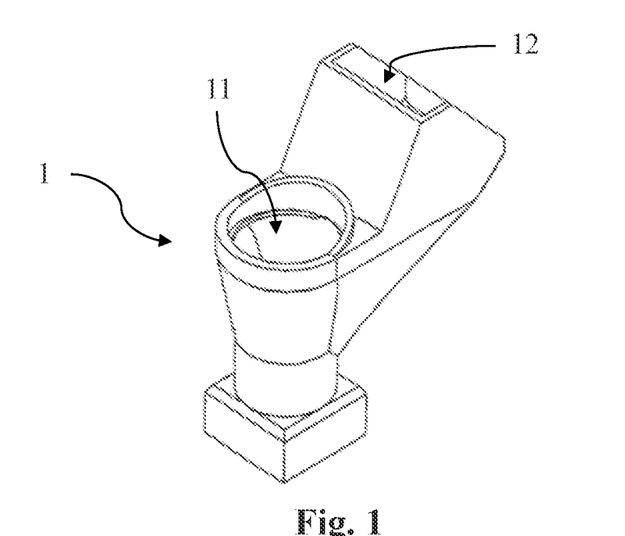
FIG. 1 shows the inspection cuvette of an embodiment of the inspection system according to the invention in a perspective view.

FIG. 1 shows a perspective view of an inspection cuvette 1 of an embodiment of the inspection system according to the invention for inspecting a contact lens. The inspection cuvette 1 comprises an insertion opening 12 allowing to insert a contact lens 2 to be inspected into the inspection cuvette 1, and a viewing top glass 11 allowing to view the contact lens 2 in the inspection cuvette 1 through the viewing top glass 11. Typically, the inspection cuvette 1 is filled with a liquid, in particular water, saline or another transparent aqueous solution. Inspection cuvette 1 can be arranged in two different positions, a first position or handling position (insertion opening 12 points vertically upwards, not shown in the drawings) in which the contact lens 2 to be inspected is inserted into the inspection cuvette 1 and removed from the inspection cuvette 1 after inspection is completed, and a second position or inspection position in which a plurality of images of the contact lens 2 may be acquired through the viewing top glass 11. Only the second position or inspection position of the inspection cuvette 1 is shown in the drawings. Typically, a plurality of inspection cuvettes 1 is arranged on a cuvette shuttle (not shown) for simultaneous or sequential inspection of a plurality of the contact lenses contained in the cuvettes arranged on the cuvette shuttle.

Figure 2:
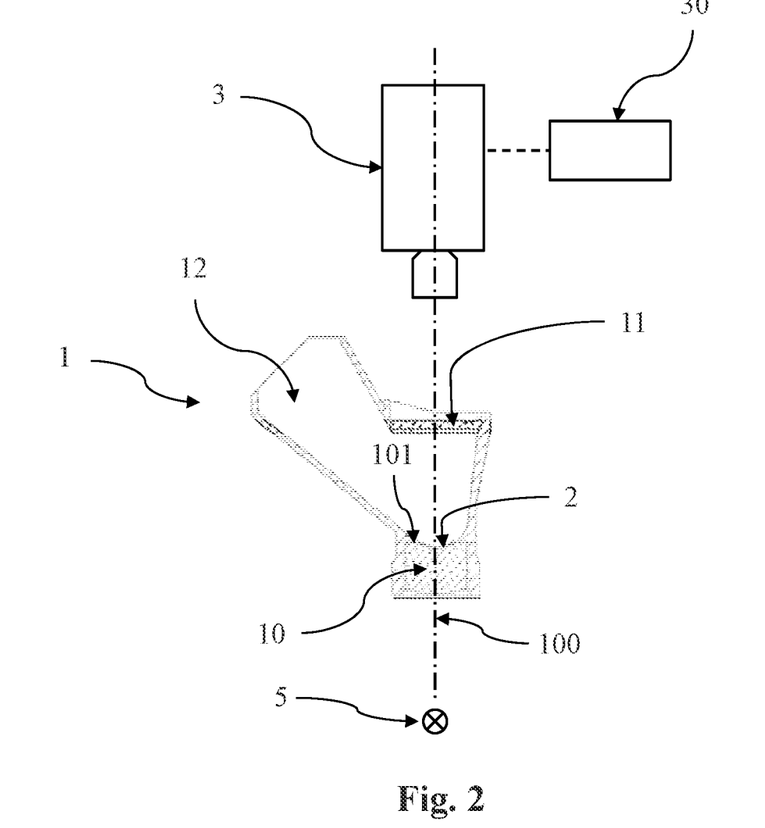
FIG. 2 shows a cross-section of the inspection cuvette of FIG. 1 with a contact lens being arranged in the inspection cuvette on a concave top surface of the bottom glass thereof, and a camera for acquiring images containing the contact lens to be inspected.

FIG. 2 shows a cross-section of the inspection cuvette 1 of FIG. 1 arranged beneath a camera 3 which is a component of an optical imaging device for optically inspecting the contact lens 2. The contact lens 2 is arranged in the inspection cuvette 1 representing a lens carrier carrying the contact lens 2 to be inspected. The inspection cuvette 1 comprises a bottom glass 10 having a concave bottom glass top surface 101 for the contact lens 2 to rest on. The contact lens 2 may be deposited on the concave bottom glass top surface 101 in a fully automated manner by introducing a gripper (not shown in FIG. 2) with the contact lens 2 adhered thereto into the liquid (not shown) contained in the inspection cuvette 1 while the inspection cuvette 1 is arranged in the first position or handling position, and by then releasing the contact lens 2 from the gripper, removing the gripper from the inspection cuvette 1, allowing the contact lens 2 to settle down by gravity, and tilting the inspection cuvette 1 from the first position (handling position) to the second position (inspection position). In this second position (inspection position) the convex anterior surface of the contact lens 2 typically rests on the concave bottom glass top surface 101 of the bottom glass 10 of inspection cuvette 1 at a default location (i.e. at the center of the concave bottom glass top surface 101) or at a location close to this default location. Camera 3 is arranged and configured such that the contact lens 2 is within a field of view of the camera 3, so that the contact lens 2 can be imaged through the viewing top glass 11 of inspection cuvette 1. In particular, the viewing axis of the camera 3 coincides with an optical axis 100 running through the center (lowermost point) of the bottom glass 10, and this optical axis 100 in turn coincides with the central axis of the illumination light beam emitted by a light source 5 which is arranged beneath the bottom glass 10 of inspection cuvette 1. Depending on the image type, the position of the light source 5 relative to the bottom glass 10 may vary and/or the inspection system may comprise additional optical elements arranged along the optical axis 100, as this is known in the art.

An embodiment of the inspection system according to the invention comprises a plurality of optical imaging devices that may consist of four separate optical imaging devices, each comprising a camera. In FIG. 2 only one optical imaging device comprising camera 3 is shown by way of example. The four separate optical imaging devices are configured to acquire four different types of images of the contact lens 2 to be inspected which is contained in the respective type of image as an imaged contact lens 42 (see FIG. 8). By way of example, a first optical imaging device of the four separate optical imaging devices is configured to acquire a telecentric bright-field image, a second optical imaging device of the four separate optical imaging devices is configured to acquire a diffuse bright-field image, a third optical imaging device of the four separate optical imaging devices is configured to acquire a dark-field image, and a fourth optical imaging device of the four separate optical imaging devices is configured to acquire a phase-contrast image. Suitable inspection systems each comprising four separate optical imaging systems each comprising a camera are available on the market and are described, for example, in WO 2015/053712. In other embodiments of the inspection system according to the invention, the number of separate optical imaging devices may be different from four. The inspection system according to the invention further comprises a processor 30 for registering the different types of images acquired by the separate optical imaging devices, and this processor 30 uses a registration function to register the different types of images. And while the processor of known inspection systems is generally capable of performing the registration of the different types of images acquired by the separate optical imaging devices, the registration function cannot be updated without the lens manufacturing process (including the inspection process) being interrupted. In contrast thereto, the processor 30 of the inspection system according to the invention is configured to update this registration function during the (running) lens manufacturing process, i.e. without the need of the lens manufacturing process being interrupted. An embodiment of the manner how the processor 30 may perform the update of the registration function during the (running) lens manufacturing process is explained in more detail below.

Figure 3:
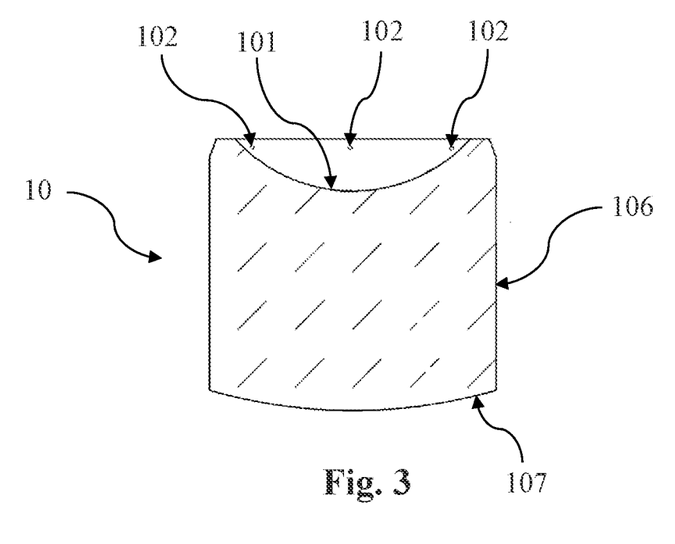
FIG. 3 shows a cross-section of the bottom glass of the inspection cuvette of FIG. 2 in an enlarged view.
Figure 4:
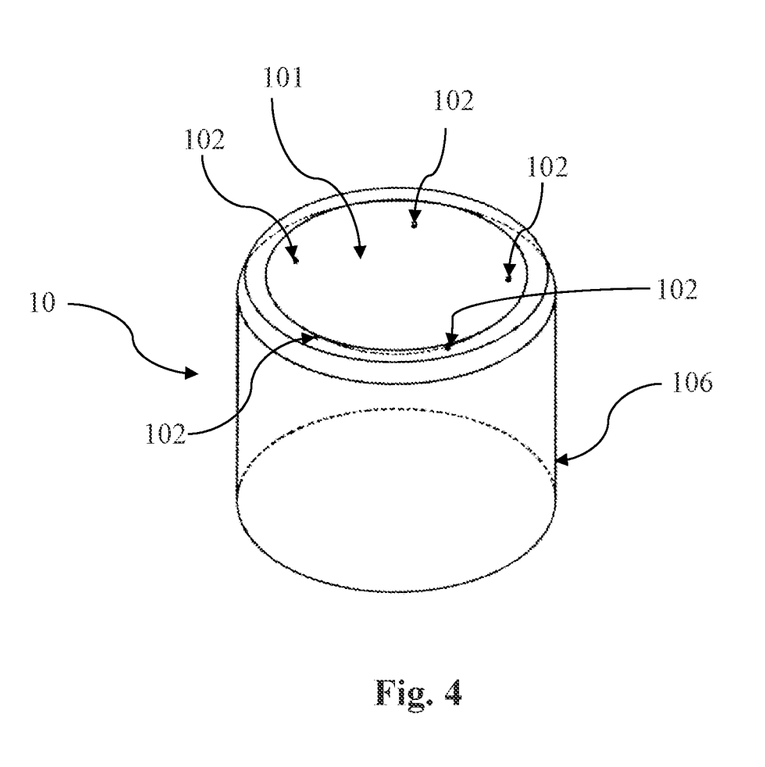
FIG. 4 shows a perspective view of the bottom glass of FIG. 3.

Turning back to the inspection cuvette 1, FIG. 3 shows a cross-section of the bottom glass 10 of the inspection cuvette 1 in an enlarged view, and FIG. 4 shows a perspective view of the bottom glass 10 shown in FIG. 3. The bottom glass 10 is made of glass, for example quartz glass, and in the embodiment shown the bottom glass 10 is of cylindrical shape and has a circular cross-section. It comprises a cylindrical bottom glass lateral surface 106 and a convex bottom glass bottom surface 107. Bottom glass 10 further comprises concave bottom glass top surface 101 for the contact lens 2 to rest on. In addition, bottom glass 10 comprises five reference marks 102 which are arranged on the concave bottom glass top surface 101. The concave bottom glass top surface 101 is a surface having a radius of curvature which is of the same order of magnitude as is the radius of curvature of the anterior surface of the contact lens 2 to be inspected, and typically the radius of curvature of the concave bottom glass surface 101 is larger than the radius of curvature of the anterior surface of the contact lens 2. Both, the concave bottom glass top surface 101 and the convex bottom glass bottom surface 107 are of optical quality.

Figure 5:
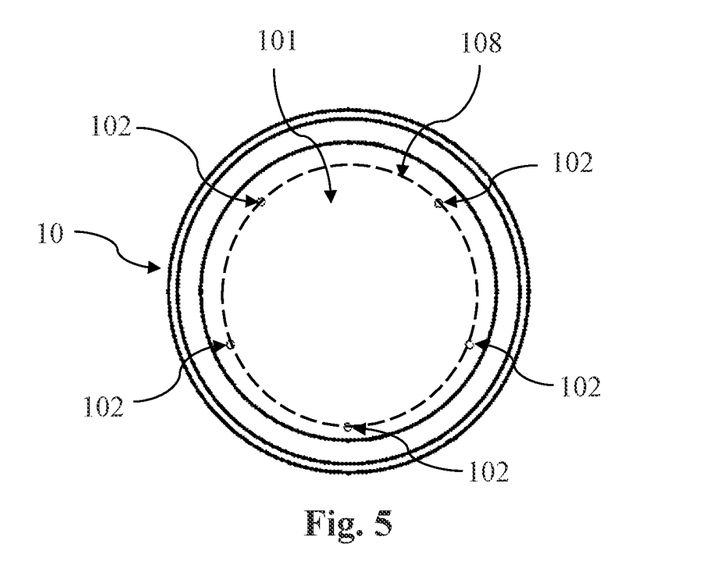
FIG. 5 shows a top view of the bottom glass of FIG. 3.

FIG. 5 shows a top view of the bottom glass 10. The reference marks 102—in the embodiment shown five reference marks 102—are arranged (equally spaced) along a (virtual) circumferentially running circle 108 (indicated by dashed lines) such that they are located outside of the contact lens 2 (not shown in FIG. 5) to be inspected when the contact lens is properly arranged in the default position. The term 'located outside of the contact lens' is to be understood in the sense that no portion of the contact lens 2 covers the respective reference mark 102 when viewed by the camera 3. Or more frankly speaking, the circumferentially running edge of the contact lens to be inspected is fully arranged inside the circumferentially running circle 108 when viewed by the camera 3. To achieve this, by way of example the circumferentially running circle 108 may have a diameter ranging from 15.40 mm (millimeters) to 16.30 mm (and in particular it may have a diameter of 15.9 mm) so that the circumferentially running edge of typical soft contact lenses is well arranged within the circumferentially running circle 108 when the contact lens is arranged in the default position (or in a position close to this default position).

Figure 6:
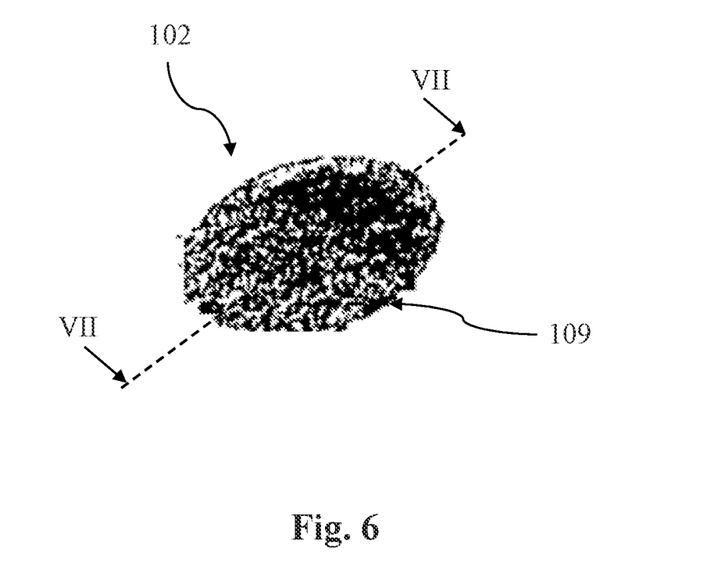
FIG. 6 shows an enlarged view of a reference mark arranged on the bottom glass of FIG. 3 in a perspective view.
Figure 7:
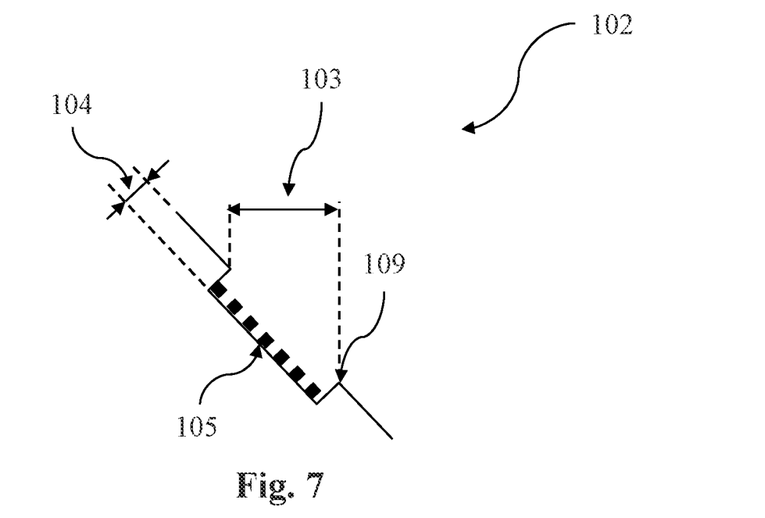
FIG. 7 shows a schematic cross-section of the reference mark of FIG. 6.

FIG. 6 shows an enlarged view of one of the reference marks 102 arranged on the bottom glass 10 (on the concave top surface 101 thereof), and FIG. 7 shows a schematic cross-section along the line VII-VII of FIG. 6 through the reference mark 102. The reference marks 102 are embodied as cylindrically shaped recesses having a circular cross-section with a diameter 103 in the range of 250 micrometers to 350 micrometers, especially about 300 micrometers. The cylindrically shaped recesses further have a depth 104 in the range of 3 micrometers to 6 micrometers, in particular about 6 micrometers. A bottom surface 105 of the cylindrically shaped recesses has a surface roughness $S_a$ in the range of 0.8 micrometers to 2 micrometers, in particular about 1.3 micrometers. The diameter 103 of the cylindrically shaped recesses is to be understood as the diameter of a perimeter 109 when viewed in the direction of the optical axis 100 (see FIG. 2), i.e. when viewed from the top. The depth 104 of the cylindrically shaped recesses is to be understood as the distance from the bottom surface 105 of the cylindrically shaped recesses to the perimeter 109 thereof. In particular, it may be understood as a mean depth averaged over the bottom surface 105.

By way of example, the cylindrically shaped recesses forming the reference marks 102 may be generated in the concave bottom glass top surface 101 of the bottom glass 10 by laser-machining techniques (engraving) using a femtosecond laser.

The dimensions, the locations and the surface roughness of the reference marks 102 (in the embodiment shown the cylindrically shaped recesses) ensure that the reference marks 102 are visible (detectable) in all images of the four different types and can thus be used for registering the images.

Figure 8:
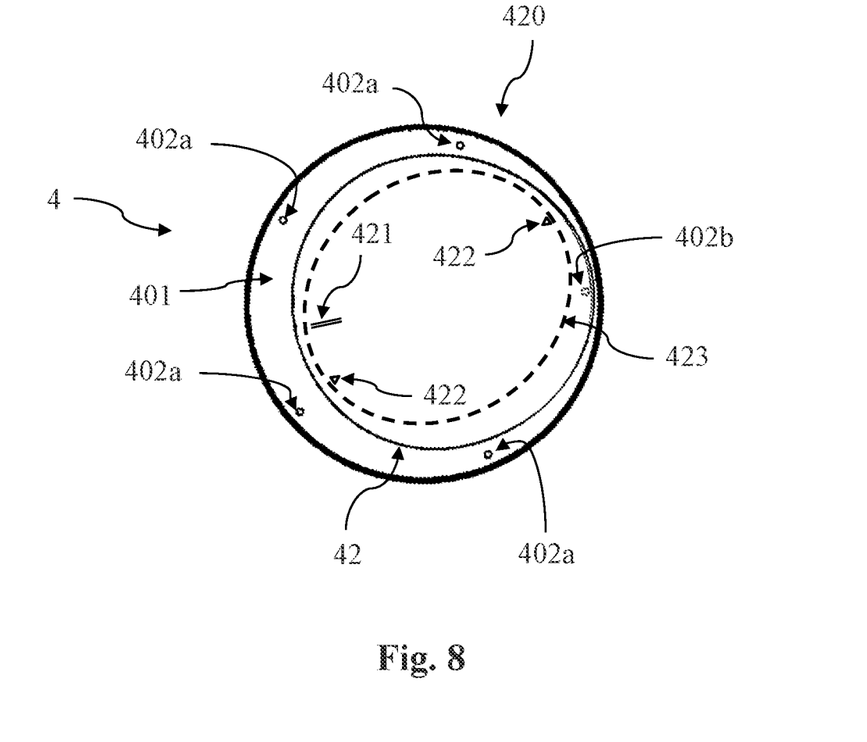
FIG. 8 shows an image acquired by the optical imaging device, the image containing the imaged ophthalmic lens and the imaged reference marks arranged on the bottom glass.

FIG. 8 shows an image 4 containing the contact lens 2 to be inspected (see FIG. 2) as an imaged contact lens 42, and further containing the reference marks 102 (see FIG. 4, FIG. 5) as imaged reference marks 402*a*, 402*b*. The image 4 further contains the concave bottom glass top surface 101 (see FIG. 4, FIG. 5) as an imaged concave bottom glass top surface 401. By way of example, the contact lens 2 contained in the image 4 as the imaged contact lens 42 is a toric contact lens used to correct astigmatism. Toric contact lenses typically have different curvatures along two different meridians which are perpendicular to each other. The different curvatures are schematically illustrated in the image 4 by the ellipse 423 shown in dashed lines. A triangular imaged lens mark 422 indicates the direction of a major axis of the said ellipse 423 (the 'cylinder axis') representing the direction of the larger radius of curvature whereas the minor axis runs perpendicular thereto and represents the smaller radius of curvature. In addition, the imaged contact lens 42 comprises a further imaged lens mark 421, and the corresponding original lens mark on the toric contact lens 2 needs to be arranged in a predetermined orientation (e.g. horizontally) when the toric contact lens 2 is worn on the eye to make sure the cylinder axis is properly oriented to correct the astigmatism. Due to the non-uniform weight/density distribution present in a toric contact lens, the center of mass of the toric contact lens does not necessarily coincide with its geometrical center. As a consequence, during the process of settling down in the inspection cuvette 1 the toric contact lens 2 may come to rest at a non-centered location on the concave bottom glass top surface 101, as shown in FIG. 8. This may result in that a portion of the contact lens 2 may cover one of the reference marks 102 as viewed by the camera 3. Accordingly, four imaged reference marks 402*a* out of the five imaged reference marks 402*a*, 402*b* are located outside the imaged contact lens 42, i.e. they are not covered by any portion of the imaged contact lens 42 as viewed by the camera 3 However, due to the non-centered location of the toric contact lens 2 on the concave bottom glass top surface, the fifth imaged reference mark 402*b* is not located outside of the imaged contact lens 42 but is covered by a portion of the toric contact lens, as viewed by the camera 3. Thus, the imaged reference mark 402*b* may be optically distorted in the image 4 due to the refractive properties of the contact lens 2. Therefore, reference marks not located outside of the imaged contact lens 42, in the embodiment described imaged reference mark 402*b*, are not used for updating the registration function or for registering the images 4. Instead, only those imaged reference marks 402*a* located outside the imaged contact lens 42 are identified and subsequently used for updating the registration function and for registering the images 4.

Figure 9:
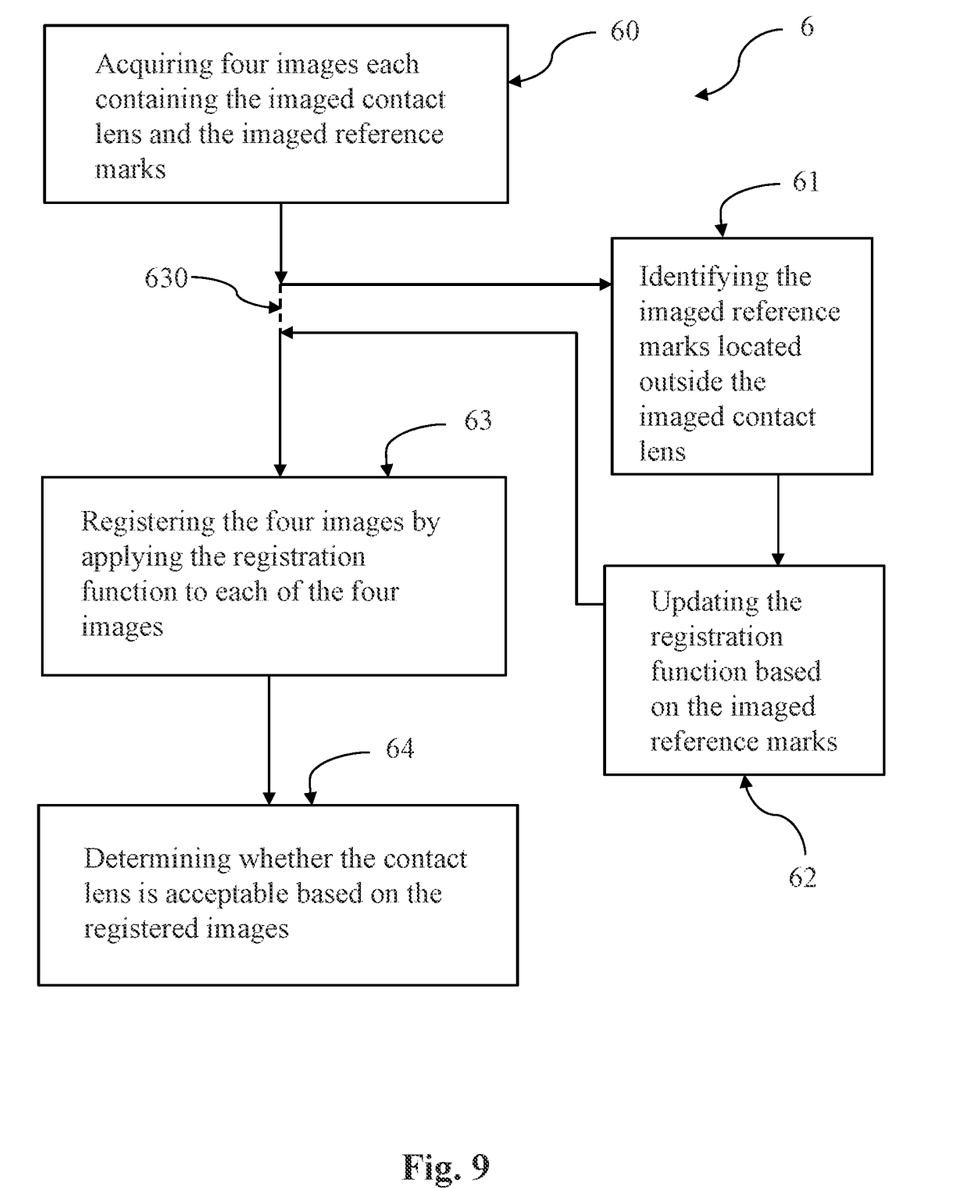
FIG. 9 shows a flow-chart illustrating an embodiment of the method for inspecting a contact lens according to the invention.

FIG. 9 shows a flow diagram of an embodiment of the method 6 for inspecting the contact lens 2 in accordance with the invention. All of the described steps of the embodiment of the method 6 are performed in a fully automated manner.

In the first step 60 of the embodiment of the method 6, four images containing the imaged contact lens 42 and five imaged reference marks 402*a*, 402*b* (FIG. 8) are acquired. Each of the four images is acquired by a separate one of the four optical imaging devices. Each of the four separate optical imaging devices may comprise a camera, such as the camera 3 (FIG. 2). Each of the four images is of a different image type. The four different image types may be a telecentric bright-field image, a diffuse bright-field image, a dark field-image and a phase-contrast image.

To acquire the images, the inspection cuvette 1 containing the contact lens 2 to be inspected is typically positioned in a fully automated manner at the inspection system comprising the four separate optical imaging devices such that the contact lens 2 and the reference marks 102 are in the field of view of each of the cameras, as this has been illustrated in FIG. 2 for one optical imaging device comprising camera 3. The four images may be acquired simultaneously and stored in a storage device (memory) for being further processed by a processor, such as the processor 30 shown in FIG. 2.

In order to be able to properly use the information contained in all four images of the different types, it is necessary to transform the four images of the different types into one common frame by registering the four images in step 63. This is done by applying a registration function to each of the four images (this registration may be performed by the processor 30). To ensure the accurate registration of the four images, the registration function needs to be updated from time to time to compensate for possible changes that may occur in the acquisition of the four images (step 60), and which may be caused by the optical imaging systems.

The registration function may be determined from the four images of the different types containing the five imaged reference marks 402*a*, 402*b* (FIG. 8). Only those imaged reference marks which are located outside of the imaged contact lens 42 are used for determining the registration function. Identification of these imaged reference marks is performed in step 61. If all five reference marks are located outside of the imaged contact lens 42, all five reference marks 402*a*, 402*b* are used. If four reference marks 402*a* out of the five reference marks 402*a*, 402*b* are located outside the image contact lens 42 (as shown in FIG. 8), then these four reference marks 402*a* are used to determine the registration function. Suitable image analysis algorithms for detecting whether or not an imaged reference mark is located outside of the imaged contact lens 42 are known in the art and need not be discussed in detail. After having identified the imaged reference marks that are to be used for determining the registration function (i.e. those imaged reference marks located outside of the imaged contact lens), the positions of these imaged reference marks are determined in each of the four images. Thereafter, the processor 30 calculates the registration function using the positions of these imaged reference marks. The respective position of each of the imaged reference marks is calculated by the processor as the center of the perimeter of the respective one of these imaged reference marks. Moreover, the processor calculates the distances of the positions of the imaged reference marks from a reference point in each of the four images, wherein the reference point is determined to be the center of the image of the bottom glass of the inspection cuvette in each of the four images.

Calculation of the registration function (which is typically an affine transformation represented by matrices) is performed in a manner such that once the registration function is calculated and applied to each of the four images, all four images to which the registration function has been applied (the 'registered' images) are of the same size and contain the imaged reference marks arranged at the same position and having the same distance from the reference point. To achieve this, by way of example one image out of the four images may be used as the reference image and the other three images out of the four images are registered with this reference image. By applying the registration function, any differences in resolution, distortion, orientation and alignment of the images of the different types relative to one another are compensated.

In step 62 the registration function is updated based on those imaged reference marks that have been identified in step 61 as being located outside of the imaged contact lens 42. As mentioned, whenever an update is performed the result of the update may be that no changes to the registration function are necessary at all or that registration function must be changed due to changes that may have occurred in one or more of the optical imaging systems. Once the update has been completed (regardless of whether or not changes to the registration function have been made), the contact lenses are inspected using the updated registration function until the next update of the registration function is to be performed. During this period steps 61 and 62 are not performed, but rather the contact lenses are inspected using the (presently) valid updated registration function This means that once the four images of the different types each containing the imaged contact lens 42 are acquired, these four images are registered using the (presently) valid registration function. This is indicated by the dashed line 630 shown in FIG. 9.

Once the four images of the different types are registered, in step 64 of FIG. 9 it is determined—based on the registered images—whether or not a contact lens is acceptable. This determination can be made based on a number of different criteria, including by way of example the maximum number and size of bubbles, inclusions, scratches, or edge defects. In case one or more such thresholds are exceeded, the contact lens is determined not to be acceptable and is disposed of. This determination whether or not a contact lens is acceptable is also made by the processor 30.

Registration of the images of the different types is helpful in that it avoids identifying structures or components that may appear as a possible defect of the contact lens in one type of image as not being a defect of the contact lens with the aid of one or more images of another type. For a proper this registration of these images, it is important to have an up-to-date registration function available. The present invention allows for updating the registration function without interruption of the lens manufacturing process, as this has been described above with the aid of embodiments.

While embodiments of the invention have been described with the aid of the drawings, the invention is not limited to these embodiments, but rather many changes and modifications are possible without departing from the teaching underlying the invention. The scope of protection is therefore defined by the appended claims.

The invention claimed is:

1. Method (6) for inspecting an ophthalmic lens (2), in an automated lens manufacturing process, the method comprising the steps of
   acquiring (60) a plurality of images containing the ophthalmic lens (2) to be inspected as an imaged ophthalmic lens (2), wherein each image (4) of the plurality of images is of a different image type,
   registering (63) the images (4) of the plurality of images by applying a registration function to each image (4) of the plurality of images to obtain registered images;
   determining (64), based on the registered images, whether the ophthalmic lens (2) is acceptable, and
   updating (62) the registration function to compensate for possible changes in the acquisition of the plurality of images,
   wherein each image (4) of the acquired plurality of images contains a plurality of imaged reference marks (402a, 402b), and wherein registering the images (4) of the acquired plurality of images and updating (62) the registration function is performed based on the positions of the imaged reference marks (402a, 402b) contained in the images (4),
   characterized in that updating (62) the registration function is performed during the automated lens manufacturing process.

2. Method (6) according to claim 1, wherein the ophthalmic lens (2) is carried by a lens carrier (1), with the lens carrier (1) having reference marks (102) arranged thereon which are contained in the images (4) as the imaged reference marks (402a, 402b).

3. Method (6) according to claim 1, further comprising the step of identifying (61) those imaged reference marks (402a) which are located outside of the imaged ophthalmic lens (42), wherein only those imaged reference marks (402a) located outside of the imaged ophthalmic lens (42) are used for registering the images (4) of the plurality of images and updating (62) the registration function.

4. Method (6) according to claim 3, wherein each image (4) of the acquired plurality of images comprises five imaged reference marks (402a, 402b), with at least four (402a) of the five (402a, 402b) imaged reference marks being located outside of the imaged ophthalmic lens (42).

5. Method (6) according to claim 1, wherein the acquired plurality of images comprises four images, the different image types of the four images being a telecentric bright-field image, a diffuse bright-field image, a dark-field image and a phase-contrast image.

6. Method (6) according to claim 1, wherein each image (4) of the plurality of images is acquired (60) by a separate optical imaging device, each separate optical imaging device comprising a camera (3).

7. Method (6) according to claim 1, wherein the registration function is an affine transformation.

8. Inspection system for inspecting an ophthalmic lens (2), in an automated lens manufacturing process, the inspection system comprising:
   a plurality of optical imaging devices, each optical imaging device of the plurality of optical imaging devices being arranged and configured to acquire (60) an image (4) containing the ophthalmic lens (2) to be inspected as an imaged ophthalmic lens (42) thus obtaining a plurality of images, wherein each image of the plurality of images (4) is of a different image type,
   a processor configured to register the images (4) of the plurality of images by applying a registration function to each image (4) of the plurality of images to obtain registered images to determine (64), based on the registered images, whether the ophthalmic lens (2) is acceptable, and to update (62) the registration function to compensate for possible changes in one or more of the optical imaging devices of the plurality of optical imaging devices,
   wherein each image (4) of the acquired plurality of images contains a plurality of imaged reference marks (402a, 402b), and wherein registering the images (4) of the acquired plurality of images and updating (62) the registration function is performed based on the positions of the imaged reference marks (402a, 402b) contained in the images (4), characterized in that the processor is further configured to update (62) the registration function during the automated lens manufacturing process.

9. Inspection system according to claim 8, wherein each image (4) of the acquired plurality of images contains a plurality of imaged reference marks (402a, 402b), and wherein the processor is further configured to register (63) the images (4) and to update the registration function based on the positions of the imaged reference marks (402a, 402b) contained in the images (4).

10. Inspection system according to claim 9, wherein the inspection system further comprises a lens carrier (1) configured to carry the ophthalmic lens, with the lens carrier having reference marks (102) arranged thereon which are contained in the images (4) as the imaged reference marks (402a, 402b).

11. Inspection system according to claim 10, wherein the lens carrier (1) is an inspection cuvette (1) having a bottom glass (10) with a concave bottom glass top surface (101) for the ophthalmic lens (2) to rest on.

12. Inspection system according to claim 9, wherein the processor is further configured to identify (61) those imaged reference marks (402a) which are located outside of the imaged ophthalmic lens (42), and wherein the processor is further configured to use only those imaged reference marks (402a) located outside of the imaged ophthalmic lens (42) to register the images (4) and to update (62) the registration function.

13. Inspection system according to claim 12, wherein the plurality of imaged reference marks (402a, 402b) comprises five imaged reference marks (402a, 402b), with at least four (402a) of the five imaged reference marks (402a, 402b) being located outside of the imaged ophthalmic lens (42), and wherein the processor is configured to use only the at least four imaged reference marks (402a) located outside of the imaged ophthalmic lens (42) to register the images (4) and to update the registration function.

14. Inspection system according to claim 10, wherein the reference marks (102) arranged on the lens carrier (1) are cylindrically shaped recesses (102) having a diameter (103) in the range of 250 micrometers to 350 micrometers, especially about 300 micrometers, the recesses (102) further having a depth (104) in the range of 3 micrometers to 6 micrometers, in particular about 6 micrometers, and wherein a bottom surface (105) of the recesses (102) has a surface roughness $S_a$ in the range of 0.8 micrometers to 2 micrometers, in particular about 1.3 micrometers.

15. Inspection system according to claim 14, wherein the recesses (102) are generated by laser-machining.

16. Inspection system according to claim 8, wherein the plurality of optical imaging devices comprises four optical imaging devices including a first optical imaging device configured to acquire a telecentric bright-field image, a second imaging device configured to acquire a diffuse bright-field image, a third imaging device configured to acquire a dark-field image, and a fourth imaging device configured to acquire a phase-contrast image.

17. Inspection system according to claim 8, wherein each optical imaging device of the plurality of optical imaging devices is a separate optical imaging device comprising a camera (3).

* * * * *